US012330152B2

(12) United States Patent
Li et al.

(10) Patent No.: US 12,330,152 B2
(45) Date of Patent: Jun. 17, 2025

(54) MICROFLUIDIC SENSOR CHIP AND MEASURING SYSTEM THEREOF

(71) Applicant: INDUSTRIAL TECHNOLOGY RESEARCH INSTITUTE, Hsinchu (TW)

(72) Inventors: Yu-Tai Li, Taichung (TW); Chia-Jen Lin, New Taipei (TW); Wei-Yu Lin, Zhubei (TW); Kao-Chi Lin, Kaohsiung (TW); Cho-Fan Hsieh, Yilan County (TW); Teng-Chun Wu, Kinmen County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 737 days.

(21) Appl. No.: 17/575,290

(22) Filed: Jan. 13, 2022

(65) Prior Publication Data

US 2023/0122850 A1 Apr. 20, 2023

(30) Foreign Application Priority Data

Oct. 15, 2021 (TW) ................................ 110138264

(51) Int. Cl.
*G01N 21/552* (2014.01)
*B01L 3/00* (2006.01)
(Continued)

(52) U.S. Cl.
CPC .... *B01L 3/502715* (2013.01); *G01N 21/3581* (2013.01); *G01N 21/554* (2013.01); *B01L 2300/04* (2013.01); *G01N 2021/5903* (2013.01)

(58) Field of Classification Search
CPC .......... B01L 3/502715; B01L 2300/04; B01L 2300/0851; B01L 2300/168;
(Continued)

(56) References Cited

U.S. PATENT DOCUMENTS

2014/0131559 A1* 5/2014 Yen ...................... G01N 21/553
250/221
2014/0199776 A1* 7/2014 Kim .................. B01L 3/502707
422/551

(Continued)

FOREIGN PATENT DOCUMENTS

CN 103616333 A 3/2014
CN 107469879 A 12/2017
(Continued)

OTHER PUBLICATIONS

Qu et al., "A terahertz multi-band metamaterial absorber and its synthetic evaluation method based on multivariate resonant response fusion for trace pesticide detection" Sensors and Actuators: B. Chemical 336 (2021) 129726, Feb. 7, 2021.

(Continued)

*Primary Examiner* — Jonathan M Hansen
(74) *Attorney, Agent, or Firm* — Maschoff Brennan

(57) ABSTRACT

A microfluidic sensor chip includes a body comprising a substrate and an upper cover, and the upper cover having at least one opening, at least one microfluidic channel formed on the substrate and has a supporting surface, wherein the at least one microfluidic channel communicates with the at (Continued)

least one opening, and a metamaterial layer coated on the supporting surface, wherein the metamaterial layer has a plurality of regions, and each region has a corresponding resonance pattern. The present disclosure further provides a measuring system for microfluidic sensor chip includes a carrying board, a plurality of the microfluidic sensor chips, a transmitter emitting a terahertz wave corresponding to the resonance pattern of one of the microfluidic sensor chips, a receiver receiving a reflected wave corresponding to the terahertz wave, and a processor receiving the reflected wave from the processor, and determining a testing sample characteristic according to the reflected wave.

13 Claims, 10 Drawing Sheets

(51) Int. Cl.
*G01N 21/3581* (2014.01)
*G01N 21/59* (2006.01)

(58) Field of Classification Search
CPC ............ G01N 21/3581; G01N 21/554; G01N 2021/5903; G01N 22/00; G01N 2021/0346
See application file for complete search history.

(56) References Cited

U.S. PATENT DOCUMENTS

| 2016/0116402 A1* | 4/2016 | Chen ................. B01L 3/502707 |
| | | 216/17 |
| 2017/0254751 A1* | 9/2017 | Zhang .................. G01N 21/554 |
| 2018/0003632 A1* | 1/2018 | Wei .................. G01N 33/54373 |
| 2020/0284660 A1* | 9/2020 | Seo ........................... G01J 3/42 |
| 2024/0151642 A1* | 5/2024 | Li ....................... G01N 21/3581 |

FOREIGN PATENT DOCUMENTS

| CN | 108376839 A | 8/2018 |
| CN | 109289946 A | 2/2019 |
| CN | 109916925 A | 6/2019 |
| CN | 110160984 A | 8/2019 |
| CN | 214277904 U | 9/2021 |
| TW | 201403061 A | 1/2014 |

OTHER PUBLICATIONS

TW Office Action in Application No. 110138264 Dated Sep. 16, 2022.

* cited by examiner

MICROFLUIDIC SENSOR CHIP AND MEASURING SYSTEM THEREOF

CROSS-REFERENCE TO RELATED APPLICATIONS

This non-provisional application claims priority under 35 U.S.C. § 119(a) on Patent Application No(s). 110138264, filed in Republic of China (ROC) on Oct. 15, 2021, the entire contents of which are hereby incorporated by reference.

BACKGROUND

1. Technical Field

This disclosure relates to a microfluidic sensor chip and measuring system thereof.

2. Related Art

Amongst the existing technologies, the enzyme-linked immunosorbent assay (ELISA) or surface plasmon resonance (SPR) technologies are mostly used for bio-detection. However, using these two technologies requires targeting the testing sample with a marker as well as amplifying the detected signal to obtain a valid detection value, which causes the increase in detection time. In addition, since using these two technologies requires consuming chemicals (such as dyeing agents) or ligand when preparing the testing sample, the cost of bio-detection also increases accordingly. Even though performing bio-detection using terahertz wave has been proposed, researchers can only perform detections on the testing samples at different frequencies one at a time since the testing samples are unknown to the researcher. Therefore, the cost of labor force and time required for performing bio-detection are still too steep.

SUMMARY

Accordingly, this disclosure provides a microfluidic sensor chip and measuring system thereof.

According to one or more embodiment of this disclosure, a microfluidic sensor chip, comprises a body comprising a substrate and an upper cover, and the upper cover having at least one opening; at least one microfluidic channel formed on the substrate and has a supporting surface, wherein the at least one microfluidic channel communicates with the at least one opening; and a metamaterial layer coated on the supporting surface, wherein the metamaterial layer has a plurality of regions, and each region has a corresponding resonance pattern.

According to one or more embodiment of this disclosure, a measuring system for microfluidic sensor chip comprises a carrying board; a plurality of microfluidic sensor chips disposed on the carrying board, wherein each microfluidic sensor chip comprises: a body comprising a substrate and an upper cover, and the upper cover having at least one opening for injecting a testing sample; at least one microfluidic channel formed on the substrate and has a supporting surface, wherein the at least one microfluidic channel communicates with the at least one opening to carry the testing sample; and a metamaterial layer coated on the supporting surface, wherein the metamaterial layer has a plurality of regions, each having a corresponding resonance pattern; a transmitter configured to emit a terahertz wave corresponding to the resonance pattern of at least one of the microfluidic sensor chips; a receiver configured to receive a reflected wave corresponding to the terahertz wave from at least one of the microfluidic sensor chips; and a processor in signal-transmittable connection with the receiver, the processor receiving the reflected wave from the processor, and determining a testing sample characteristic according to the reflected wave.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIGS. 1A and 1B are illustrative diagrams showing microfluidic sensor chip according to an embodiment of the present disclosure, wherein FIG. 1B illustrates an exploded view of FIG. 1A;

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

It should first be noted that, the term "in signal-transmittable connection" may refer to two or more elements being in electrical connection with each other. The term "in signal-transmittable connection" may also refer to two or more elements being in communication connection with each other, for example, through WiFi, Bluetooth, etc.

Figure 1A:
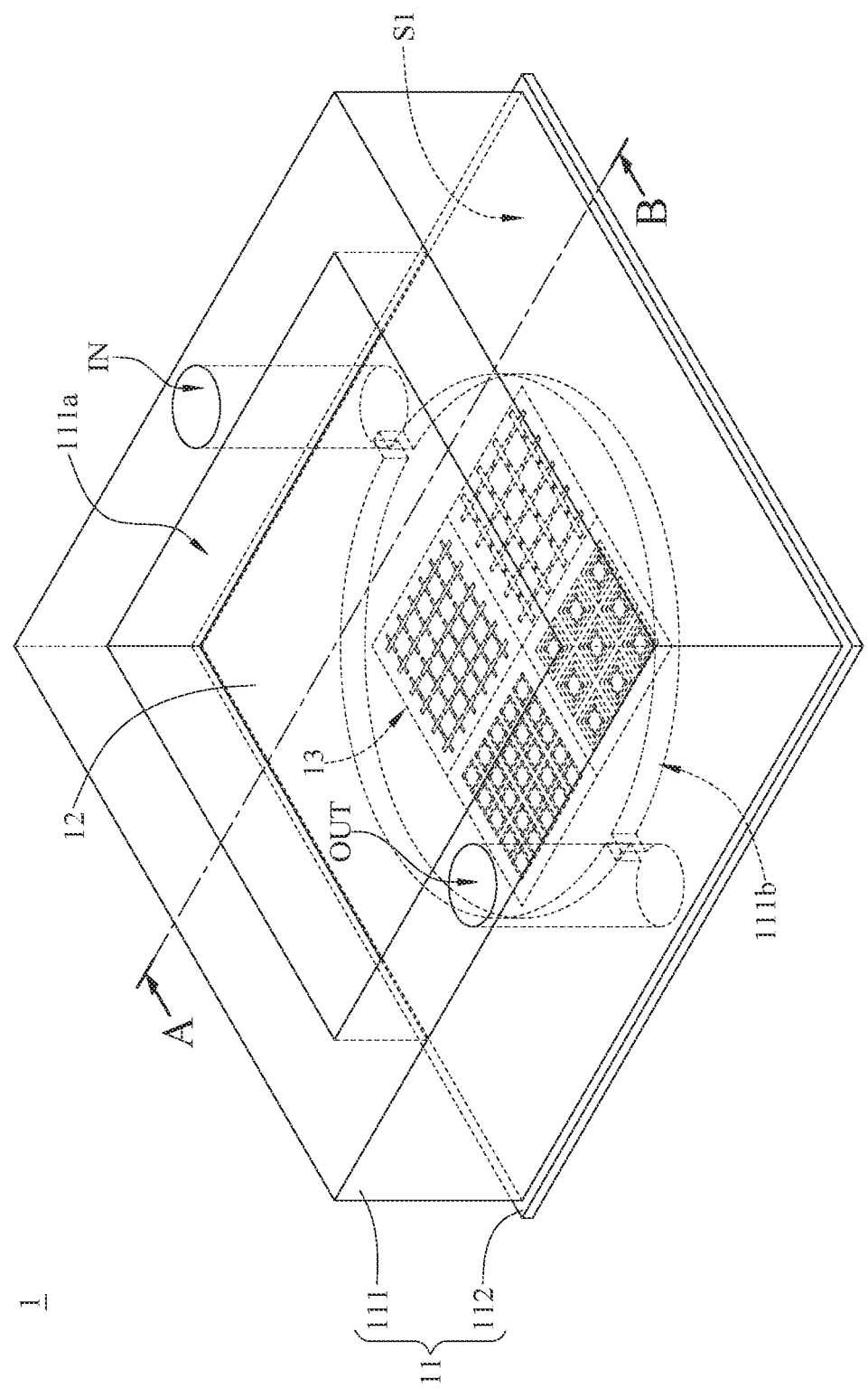
Figure 1B:
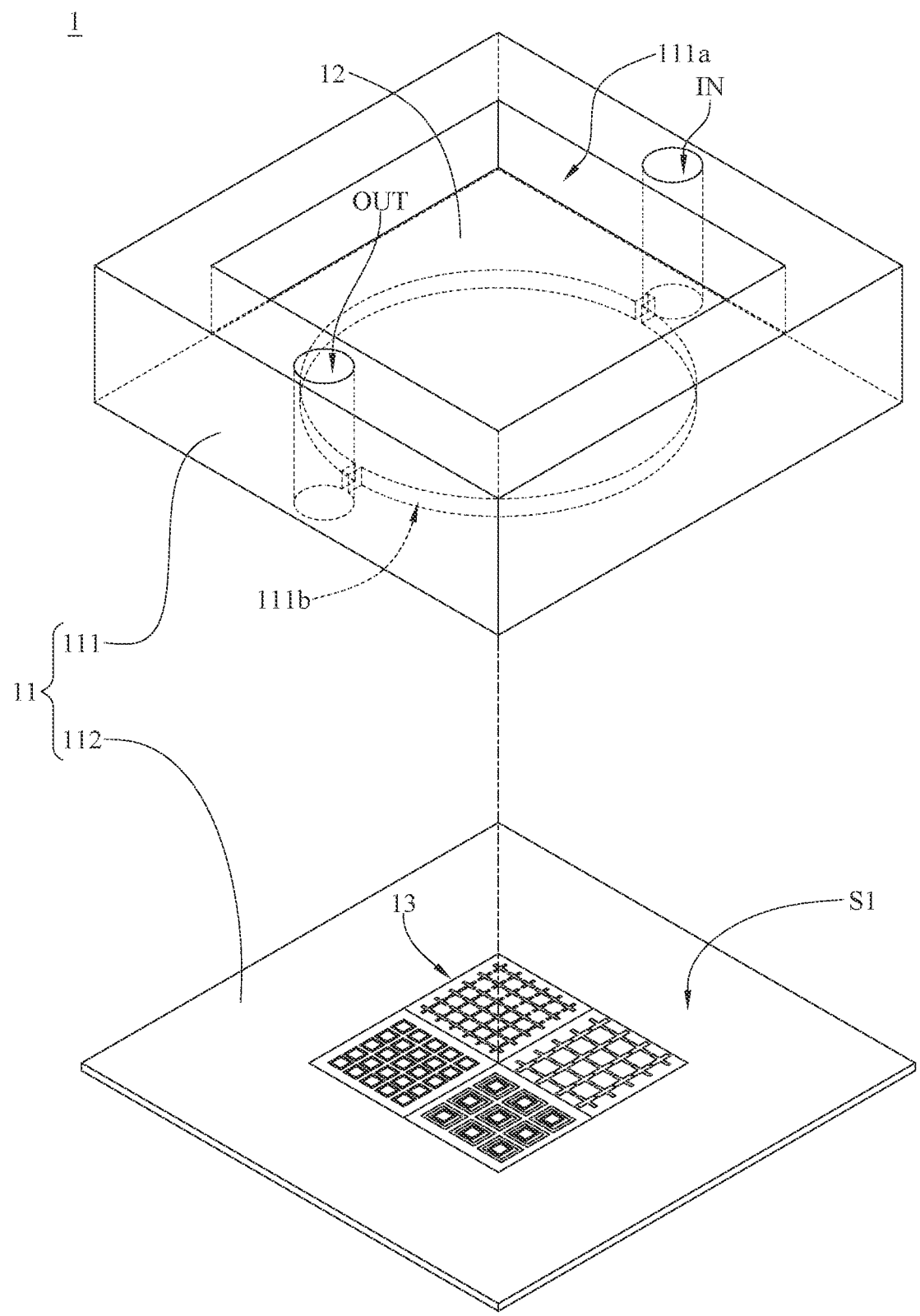
Figure 1C:
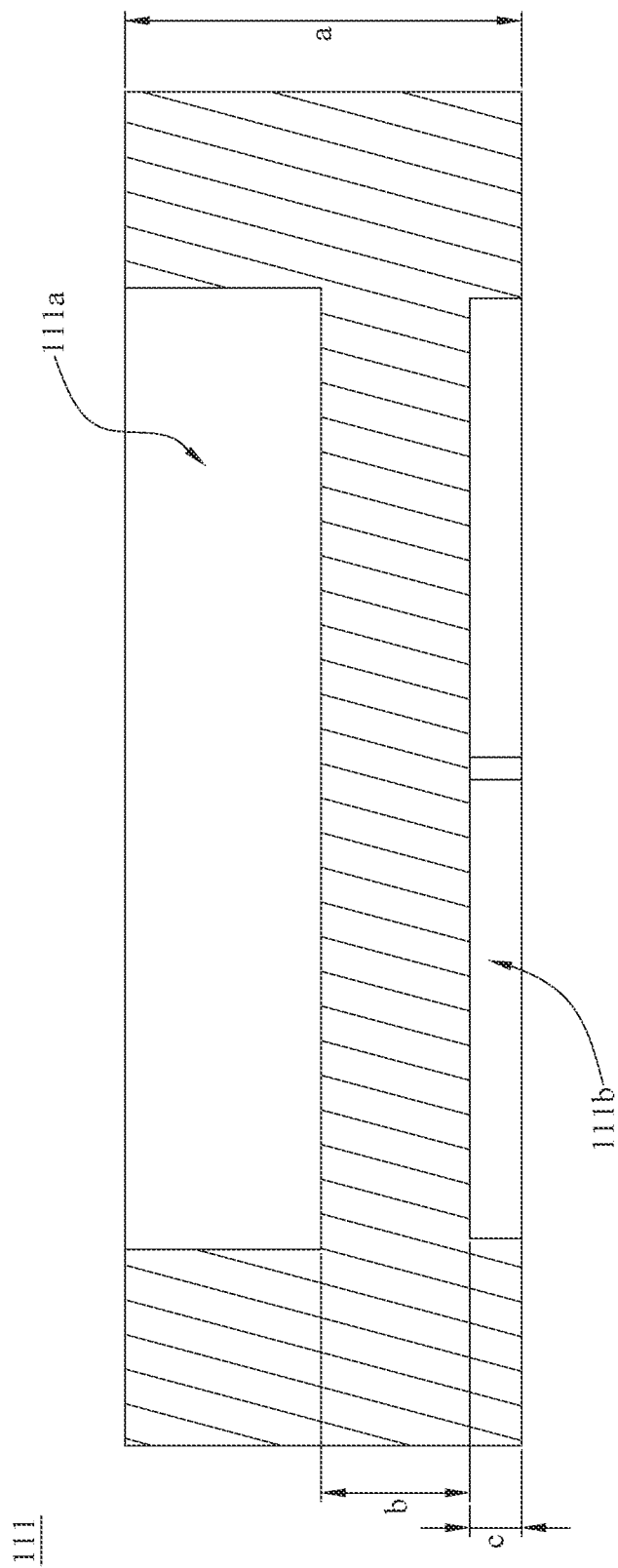
FIG. 1C illustrates a cross-section diagram along the line A-B of the upper cover 111 of FIG. 1A.

Please refer to FIGS. 1A, 1B and 1C. FIGS. 1A and 1B are illustrative diagrams showing microfluidic sensor chip according to an embodiment of the present disclosure, wherein FIG. 1B illustrates an exploded view of FIG. 1A, and FIG. 1C illustrates a cross-section diagram along the line A-B of the upper cover 111 of FIG. 1A. The microfluidic sensor chip 1 of the present disclosure may comprise a body 11, at least one microfluidic channel 12 and a metamaterial layer 13.

The body 11 comprises an upper cover 111 and a substrate 112, and the substrate 112 may be, for example, a plastic substrate or a glass substrate. In addition, both the upper cover 111 and the substrate 112 may also be made of polydimethylsiloxane (PDMS) material or any other material that is penetrable to terahertz waves. The upper cover 111 has at least one opening, and FIG. 1A shows a first opening IN. The first opening IN communicates with the microfluidic channel 12 of the microfluidic sensor chip 1, for fluid (such as, liquid testing sample) to be injected into the microfluidic channel 12. Further, the upper cover 111 preferably has a second opening OUT to drain the liquid (for example, said liquid testing sample) in the microfluidic channel 12. The upper cover 111 covers the substrate 112 with a space existing therebetween, which is the microfluidic channel 12.

The microfluidic channel 12 is formed on the substrate 112 and has a supporting surface S1, and the metamaterial layer 13 is coated on the supporting surface S1. The metamaterial layer 13 is preferably located at the center of the substrate 112. The metamaterial layer 13 preferably has a plurality of regions, and each of the regions has a corresponding resonance pattern, such as the metamaterial layer 13 shown in FIG. 2A and the metamaterial layer 13' shown in FIG. 2B, to generate resonance for different incident waves corresponding to different frequencies. Further, by adopting the terahertz wave and metamaterial, the detected signal may be efficiently amplified to provide accurate and valid detection data. The following will first describe the structure of the microfluidic sensor chip 1, and the specific structure of the metamaterial layer 13 will be described in reference with FIGS. 2A and 2B.

Please continue to refer to FIGS. 1A to 1C, wherein FIG. 1C illustrates a cross-section diagram along the line A-B in FIG. 1A of the upper cover 111. The upper cover 111 has a first recessed part 111a recessed towards the substrate 112, and a projection of the first recessed part 111a on the substrate 112 covers the projections of the regions on the substrate 112. In other words, the area of projection of the first recessed part 111a on the substrate 112 is preferably not smaller than the area total of the regions of the metamaterial layer 13, and the projection of the first recessed part 111a on the substrate 112 preferably at least partially overlaps the projections of the regions of the metamaterial layer 13 on the substrate 112. By forming the first recessed part 111a on the substrate 112, the ratio of the terahertz wave being absorbed while traveling in the microfluidic sensor chip 1 may be reduced, to maintain the intensity of the terahertz wave.

Moreover, a side of the upper cover 111 opposite to the first recessed part 111a may be formed with a second recessed part 111b, and the second recessed part 111b is recessed towards the first recessed part 111a. The second recessed part 111b preferably faces the first recessed part 111a. The second recessed part 111b may constitute a part of the microfluidic channel 12. Further, the second recessed part 111b is formed between the upper cover 111 and the substrate 112 forms. For example, the thickness "a" of the upper cover 111 may be 2 mm; the distance "b" between the first recessed part 111a and the second recessed part 111b may be 0.5 mm; and the depth "c" of the second recessed part 111b may be 10 μm.

Figure 2A:
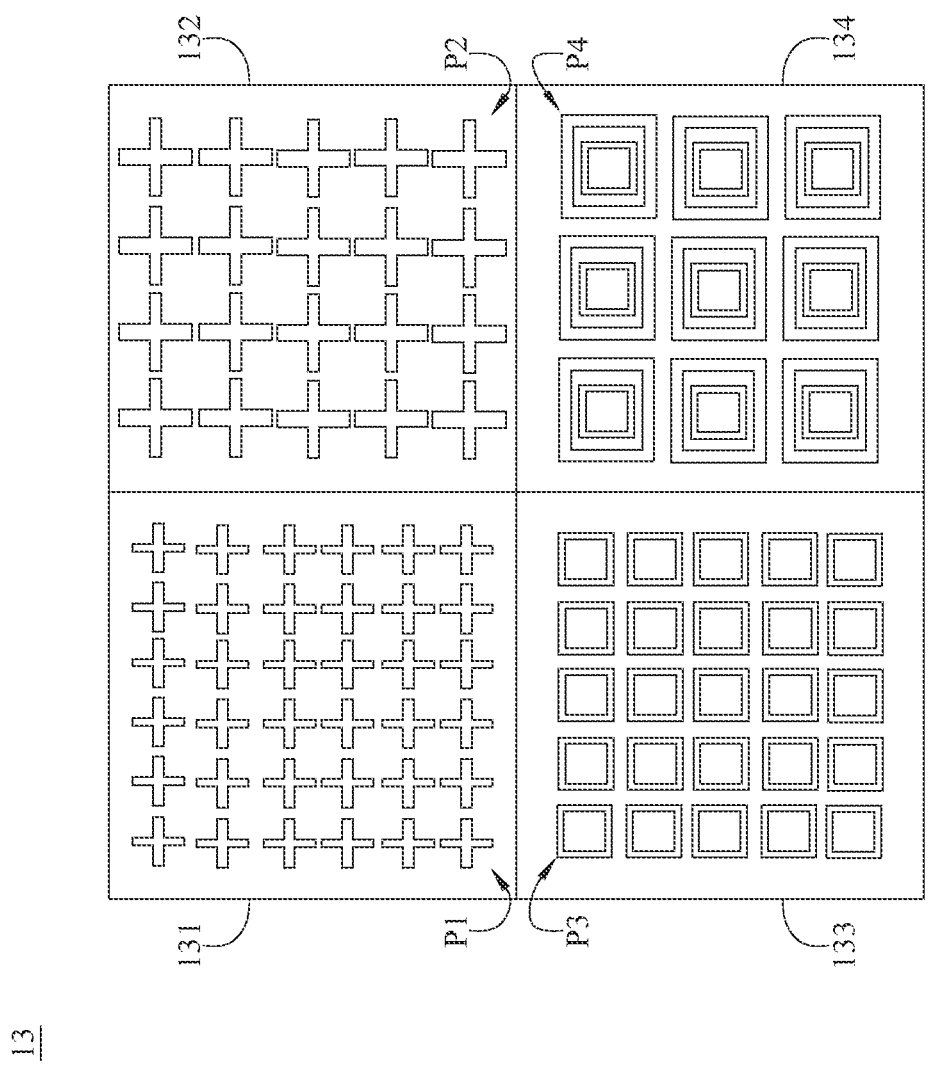
FIGS. 2A-2C are illustrative diagrams showing the metamaterial layer according to embodiments of the present disclosure.
Figure 2B:
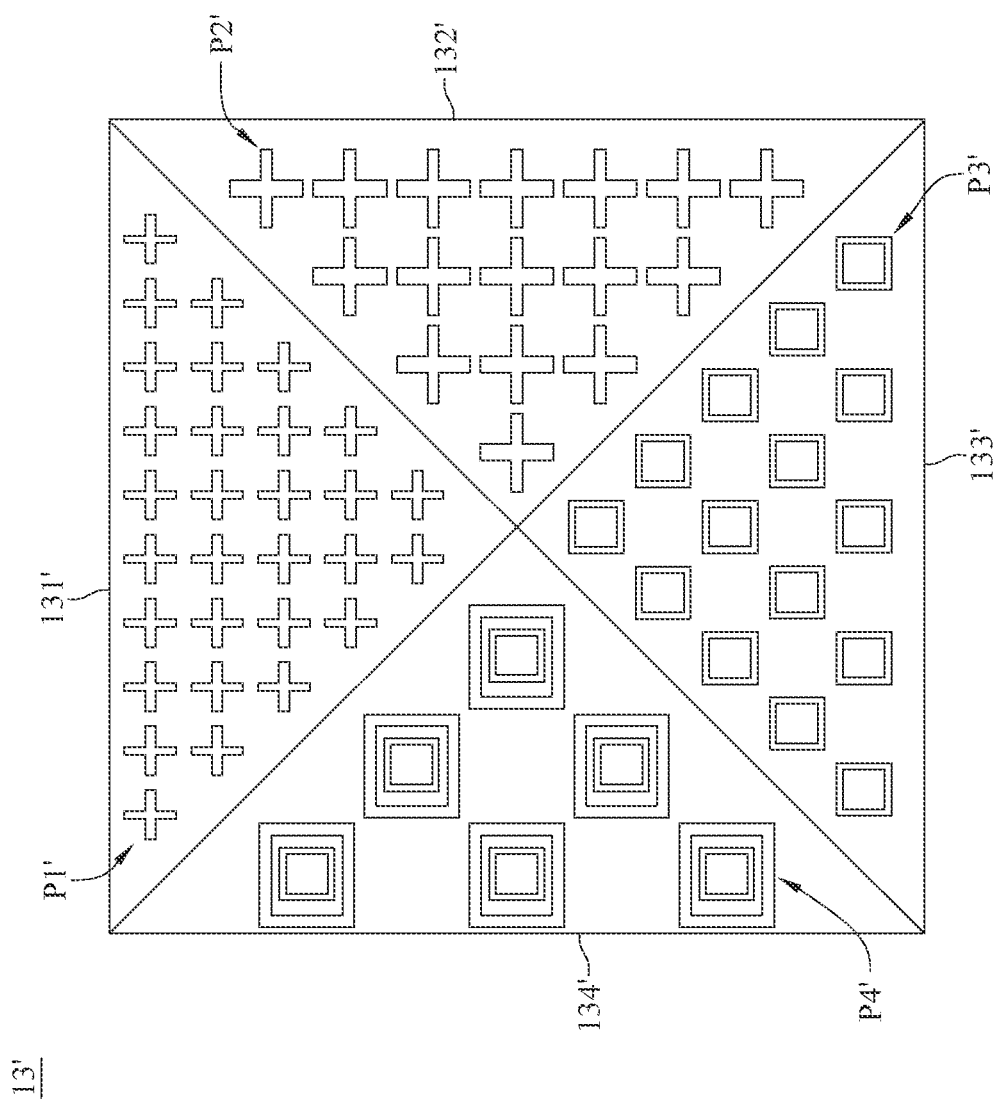
Figure 2C:
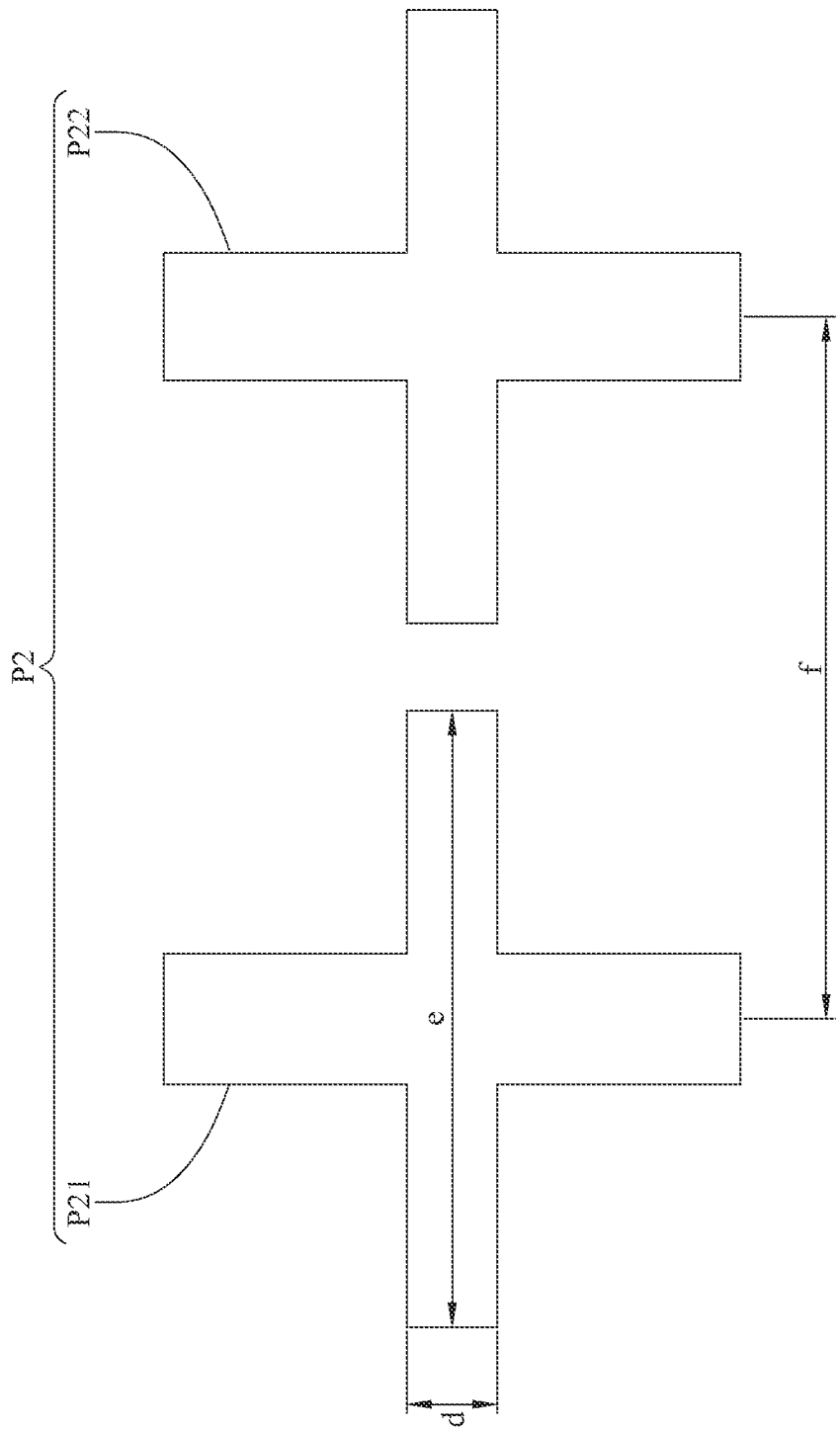

Please refer to FIGS. 2A to 2C, FIGS. 2A-2C are illustrative diagrams showing the metamaterial layer according to embodiments of the present disclosure. Specifically, FIGS. 2A-2C show various embodiments of the resonance patterns on the metamaterial layer 13 in FIG. 1A.

In should be noted that, the resonance patterns shown in FIGS. 2A-2C are exemplary diagrams to shown that the resonance patterns may be formed with different shapes, sizes and structures etc. based on the required resonance frequency and amplitude. The present disclosure does not limit the specific patterns of the resonance patterns. In addition, the resonance patterns may be formed on the metamaterial layer 13 through at least one of a cathodic etching technique, a metal evaporation technique and an ion-beam etching technique. The present disclosure does not limit the method used to form the resonance patterns on the metamaterial layer 13.

Please refer to FIG. 2A, the metamaterial layer 13 comprises a first region 131, a second region 132, a third region 133 and a fourth region 134, and each of the first region 131 to the fourth region 134 may be a square with a side length of 5 mm. As shown in FIG. 2A, the first region 131 to the fourth region 134 may comprise resonance patterns P1 to P4 respectively, and each of the resonance patterns P1 to P4 is preferably a periodic pattern, but the present disclosure is not limited thereto. The resonance patterns P1 to P4 may also be irregular patterns. Each of the first region 131 to the fourth region 134 may have multiple microstructures, the microstructures in the same region are formed on the metamaterial layer 13 repeatedly and regularly, and the microstructures of each region may form as the resonance patterns of the region.

The resonance patterns P1 to P4 may be different from one another to correspond to different frequencies. Further, the resonance frequencies are equally spaced, and the highest resonance frequency among the resonance frequencies may be the highest detectable frequency of a receiver for receiving a reflected wave. For example, when the highest detectable frequency is 1 tera hertz (THz), the resonance frequencies of the resonance patterns P1 to P4 may respectively be 0.4 THz, 0.6 THz, 0.8 THz and 1 THz. In addition, the resonance frequencies of the resonance patterns P1 to P4 may also be equally spaced in the range of 0.1 THz to 3 THz. The present disclosure does not limit the range of the resonance frequency of the resonance patterns P1 to P4, however.

Therefore, when a testing sample is injected into the microfluidic sensor chip 1 to measure the physical property (for example, difference in coefficients of refraction or dielectric coefficients) of the testing sample using microfluidic sensor chip 1 and terahertz wave, four pieces of data may be obtained at the same time because the first region 131 to fourth region 134 with different resonance patterns P1 to P4 are disposed. Accordingly, the labor cost and time required for performing bio-detection may be reduced. Further, by setting the resonance frequencies to be equally spaced within a range with the highest detectable frequency being the upper limit of said range, the overall physical properties of the testing sample corresponding to said range may be obtained more efficiently. Accordingly, a user may determine the characteristics (for example, coefficients of refraction and/or dielectric coefficients) of the testing sample based on the four pieces of data, and determine what the testing sample is based on a pre-established table recording the correspondence between coefficients of refraction and/or dielectric coefficients and item names.

Please then refer to FIG. 2B. Similar to FIG. 2A, the metamaterial layer 13' of FIG. 2B comprises a first region 131', a second region 132', a third region 133' and a fourth region 134'. The difference between FIGS. 2A and 2B lies in that, the first region 131' to the fourth region 134' of FIG. 2B may be formed as an isosceles triangle. The resonance frequencies of the resonance patterns P1 to P4 of the first region 131' to the fourth region 134' may also be equally spaced, and the highest resonance frequency among the four resonance frequencies may be the highest detectable frequency of a receiver for receiving a reflected wave.

Further, in an embodiment not shown in the drawings, the metamaterial layer 13/13' may have eight regions with different resonance patterns or nine regions with different resonance patterns, and the regions may be in the shape of rectangle, triangle etc. The present disclosure does not limit the amount, shape and frequency of regions of the metamaterial layer 13/13'. By having eight or nine regions with different resonance patterns on the metamaterial layer 13/13', more pieces of data may be obtained with only preparing one testing sample.

Please proceed referring to FIG. 2C. FIG. 2C illustrates an exemplary diagram of microstructures P21 and P22 of the resonance pattern P2 shown in FIG. 2A, wherein the microstructures P21 and P22 are cross-shaped microstructures. FIG. 2C exemplarily shows two microstructures P21 and P22, but the actual amount of the microstructures may be modified according to requirement. The microstructures P21 and P22 shown in FIG. 2C are preferably formed as periodic structures of the periodic resonance pattern P2. The height "d", width "e" and periodic interval "f" may be adjusted based on the required resonance frequency. For example, when the required resonance frequency is 0.29 THz, the height "d", width "e" and periodic interval "f" may respectively be 64 µm, 352 µm and 480 µm, the present disclosure does not limit the resonance frequency of the resonance pattern P2. Further, the shapes of the microstructures that form the periodic pattern may also be in a "C" shape, a circle, an oval, and bow shape etc. The present disclosure does not limit the shapes of the microstructures.

Figure 3:
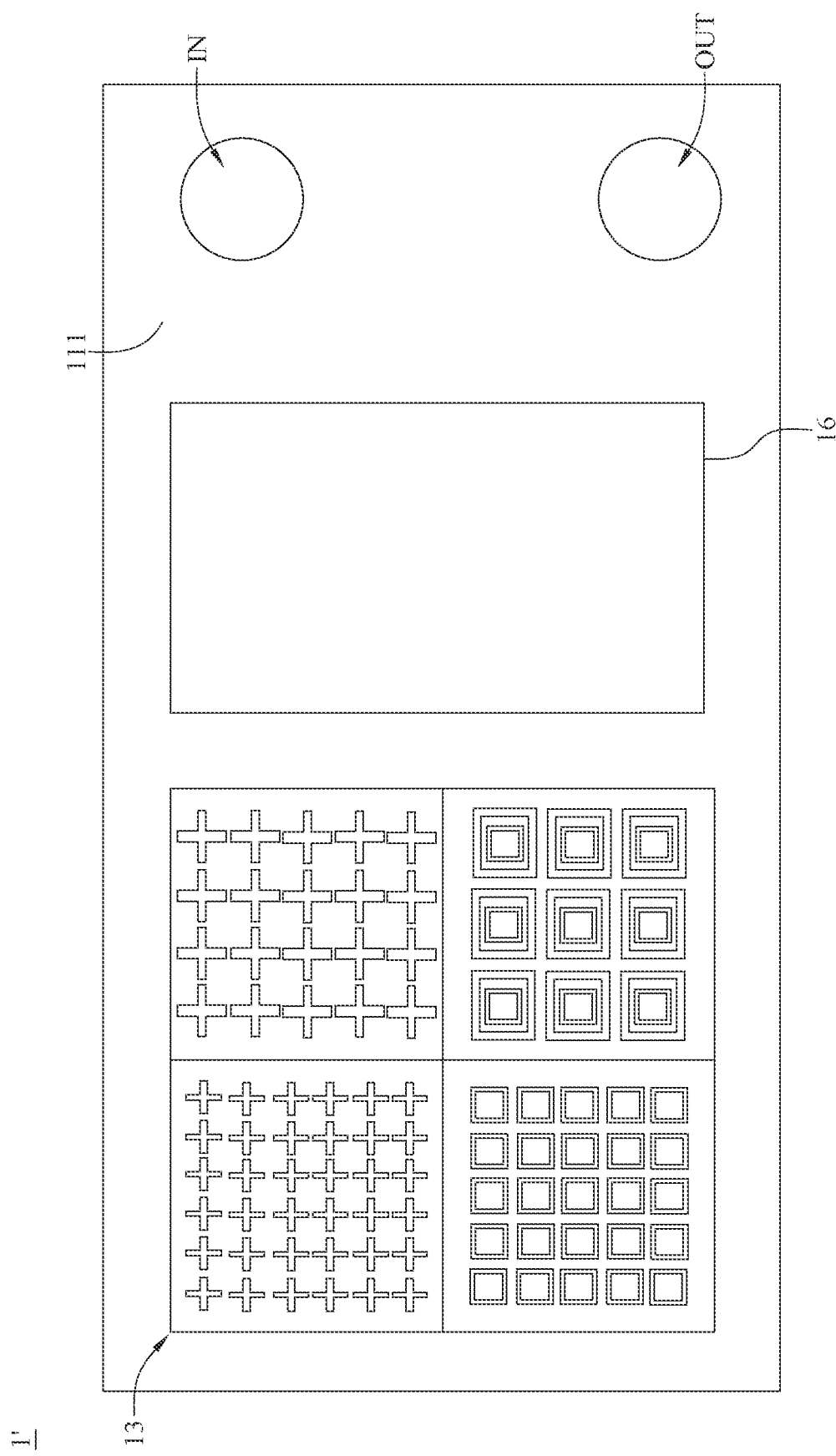
FIG. 3 is an illustrative diagram showing microfluidic sensor chip according to another embodiment of the present disclosure.

Please refer to FIG. 3. FIG. 3 is an illustrative diagram showing microfluidic sensor chip according to another embodiment of the present disclosure. The microfluidic sensor chip 1' of FIG. 3 is similar to the microfluidic sensor chip 1 of FIGS. 1A and 1B, and thus similar features thereof are omitted here. The difference between the microfluidic sensor chip 1' of FIG. 3 and the microfluidic sensor chip 1 of FIGS. 1A and 1B is that, the microfluidic sensor chip 1' of FIG. 3 further comprises a microwave patch 14, and the microwave patch 14 is attached to an upper surface of the upper cover 111. The range of resonance frequency of the metamaterial layer 13 of the microfluidic sensor chip 1' may also be equally spaced from 0.1 THz to 3 THz, and the frequency of the microwave patch 14 may be, for example, 1G, but the present disclosure does not limit the frequency of the microwave patch 14. By disposing the microwave patch 14 on the microfluidic sensor chip 1', the overall range of resonance frequency of the microfluidic sensor chip 1' may be enlarged.

Figure 4A:
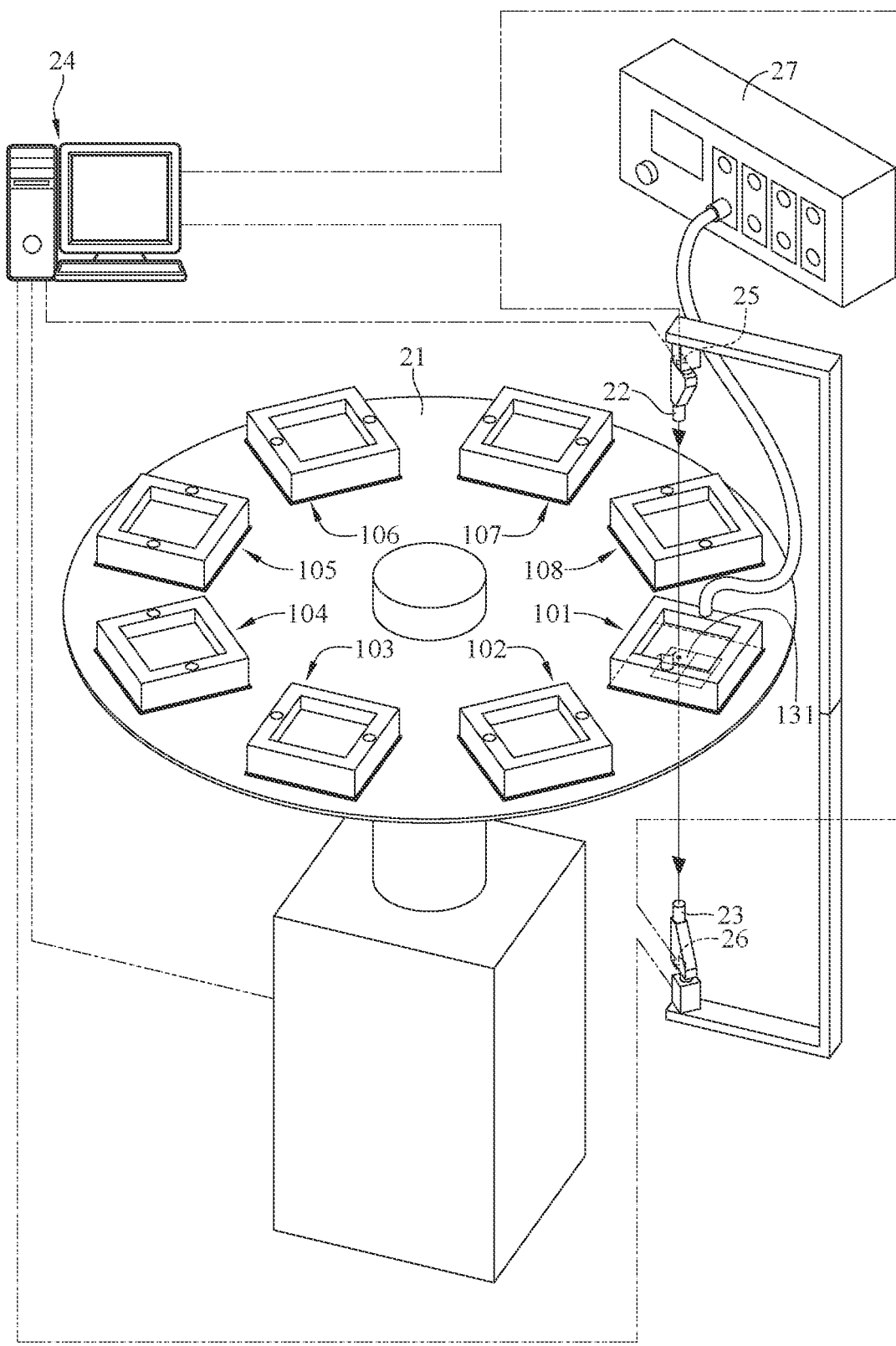
FIGS. 4A-4C are illustrative diagrams showing the measuring system for microfluidic sensor chip according an embodiment of the present disclosure.
Figure 4B:
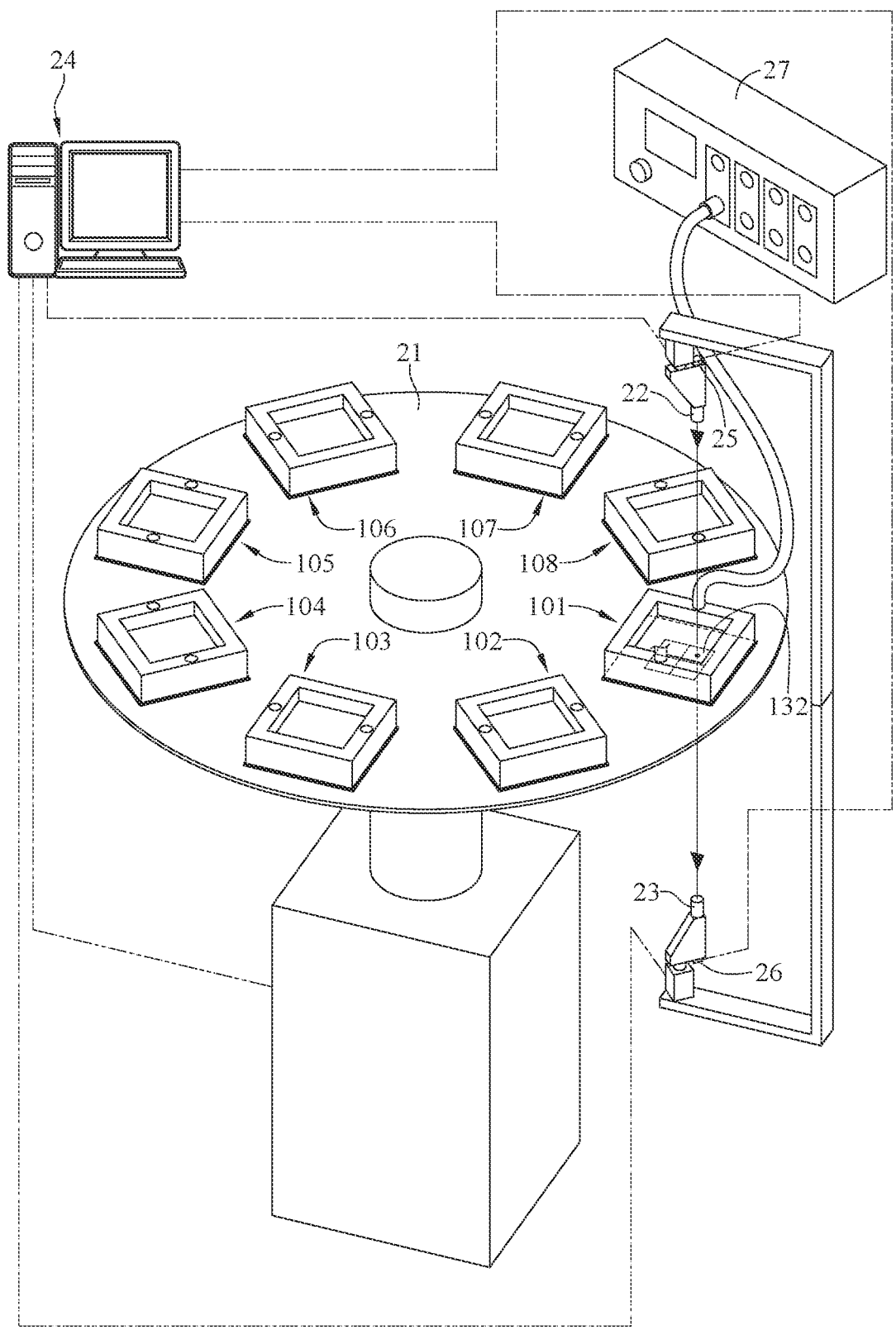
Figure 4C:
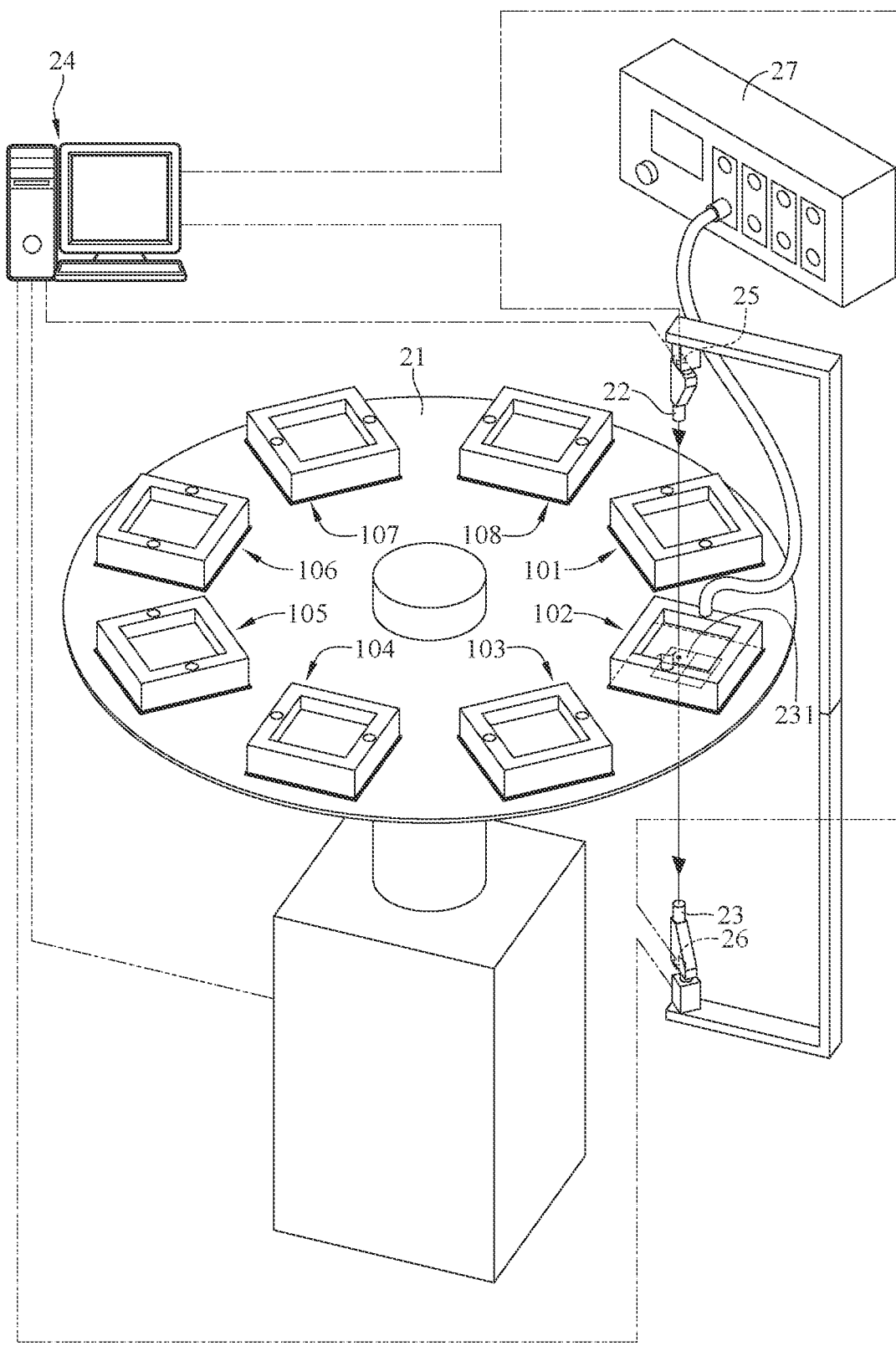

Please refer to FIGS. 4A to 4C. FIGS. 4A-4C are illustrative diagrams showing the measuring system for microfluidic sensor chip according an embodiment of the present disclosure. The measuring system for microfluidic sensor chip of FIGS. 4A-4C comprises a plurality of microfluidic sensor chips 101 to 108, a carrying board 21, a transmitter 22, a receiver 23 and a processor 24, wherein the processor 24 is in signal-transmittable connection with the transmitter 22 and the receiver 23. The processor 24 controls the transmitter 22 to emit terahertz wave, and receives a reflected wave reflected from the microfluidic sensor chips 101 to 108 by the receiver 23. The frequency of terahertz wave emitted by the transmitter 22 may range, for example, from 0.1 THz to 10 THz, but the present disclosure does not limit the frequency of terahertz wave emitted by the transmitter 22, however.

FIGS. 4A-4C uses the metamaterial layer 13 of FIG. 2A for example, but the metamaterial layer of the microfluidic sensor chip disposed on the carrying board 21 may also be the metamaterial layer 13' of FIG. 2B. The present disclosure does not limit the microfluidic sensor chips disposed on the carrying board 21 and their metamaterial layers to be particular types. Accordingly, the physical properties of the testing samples loaded into the microfluidic sensor chips 101 to 108 may be obtained using the measuring system for microfluidic sensor chip of the present disclosure.

The following takes the metamaterial layer 13 of FIG. 2A as example explaining the system shown in FIGS. 4A to 4C. The carrying board 21 is preferably connected to an actuator (for example, a motor), and the processor 24 is in signal-transmittable connection with the actuator to control the rotation of the carrying board 21. Therefore, the microfluidic sensor chip 101 on the carrying board 21 may be rotated to a direction where the wave emitted by the transmitter 22 can be received, and the reflected wave may be reflected to the receiver 23.

As described above, the transmitter 22 is configured to emit a terahertz wave to at least one of the microfluidic sensor chips 101 to 108, wherein the emitted terahertz wave corresponds to the resonance pattern said at least one microfluidic sensor chip. The receiver 23 is configured to receive the reflected wave corresponding to the emitted terahertz wave. Specifically, the measuring system for microfluidic sensor chip may further comprise a first turntable 25 and a second turntable 26. The first turntable 25 is connected to a first actuator, the second turntable 26 is connected to a second actuator, and the first actuator and the second actuator are in signal-transmittable connection with the processor 24. Accordingly, the processor 24 may actuate, respectively by the first actuator and the second actuator, the first turntable 25 and the second turntable 26 to rotate in the same direction around a center of each of the microfluidic sensor chips.

In short, the carrying board 21, the first turntable 25 and the second turntable 26 of the present disclosure are preferably connected to their own actuators, and the actuators are further connected to the processor 24. Therefore, the processor 24 may control the rotation of the carrying board 21, the first turntable 25 and the second turntable 26 through the actuators.

Take FIG. 4A for example, specifically, the operation of the measuring system for microfluidic sensor chip of the present disclosure is that, the processor 24 controls the first actuator to actuate the first turntable 25 to rotate, so that the first region 131 of the first microfluidic sensor chip 101 faces the transmitter 22. Similarly, the processor 24 controls the second actuator to actuate the second turntable 26 to rotate, so that the receiver 23 faces the emitting terminal of the transmitter 22. Then, the processor 24 controls the transmitter 22 to emit the terahertz wave corresponding to the resonance pattern of the first region 131, and the receiver 23 to receive the corresponding reflected wave.

Then, please refer to FIG. 4B, the processor 24 again controls the first actuator to rotate the transmitter 22 to face the second region 132 of the same microfluidic sensor chip 101, and controls the second actuator to rotate the receiver 23 to facing the emitting terminal of the transmitter 22. The processor 24 then controls the transmitter 22 to emit the terahertz wave corresponding to the resonance pattern of the second region 132, and the receiver 23 is unutilized to receive the corresponding reflected wave.

Accordingly, the processor 24 may obtain the physical properties of the reflected wave corresponding to every region on the metamaterial layer 13 of the microfluidic sensor chip 101. Since the resonance pattern of each region on the metamaterial layer 13 corresponds to different resonance frequency, the processor 24 may obtain the difference between the physical properties of each terahertz wave and the physical properties of each reflected wave under different resonance frequency, wherein the difference between the physical properties may be the difference in frequency or amplitude. Therefore, the processor 24 may determine the characteristic of the testing sample loaded in the microfluidic sensor chip 101.

Please refer to FIG. 4C. After obtaining the difference of physical properties of the microfluidic sensor chip 101, the processor 24 may control the actuator of the carrying board 21 to rotate the carrying board 21, for the first region 231 of the next microfluidic sensor chip 102 to face the emitting terminal of the transmitter 22. The processor 24 may repeat the processes of controlling the transmitter 22, the receiver 23, the first actuator and the second actuator. Accordingly, it is possible to continuously measure different microfluidic sensor chips and different the resonance patterns in each microfluidic sensor chip.

In addition, the measuring system for microfluidic sensor chip may further comprise a flow controller 27 configured to control a flow or a flow rate of the testing samples loaded in the microfluidic sensor chips 101 to 108. Accordingly, the flow of the testing samples in the microfluidic sensor chip 1 may be controlled. The flow controller 27 may be a syringe pump, a peristaltic pump or a pressure-driven flow controller, the present disclosure does not limit the type of the flow controller 27.

In view of the above description, the microfluidic sensor chip and measuring system thereof according to one or more embodiments of the present disclosure may effectively amplify the reflected signals to obtain accurate and valid detection data. Further, with the microfluidic sensor chip and measuring system thereof of the present disclosure, it is possible to continuously measure different microfluidic sensor chips and different the resonance patterns in each microfluidic sensor chip, thereby lowering the labor cost and time required for performing bio-detection.

What is claimed is:

1. A microfluidic sensor chip, comprising:
   a body comprising a substrate and an upper cover, and the upper cover having at least one opening;
   at least one microfluidic channel formed on the substrate and has a supporting surface, wherein the at least one microfluidic channel communicates with the at least one opening; and
   a metamaterial layer coated on the supporting surface, wherein the metamaterial layer has a plurality of regions, and each region has a corresponding resonance pattern,
   wherein the upper cover has a first recessed part recessed towards the substrate, and a projection of the first recessed part on the substrate covers projections of the regions on the substrate.

2. The microfluidic sensor chip according to claim 1, wherein the resonance patterns respectively correspond to a plurality of resonance frequencies, and the resonance frequencies are different from one another.

3. The microfluidic sensor chip according to claim 2, wherein the resonance frequencies are equally spaced, and the resonance frequencies are different from one another.

4. The microfluidic sensor chip according to claim 1, wherein the upper cover further has a second recessed part recessed in a direction of the first recessed part, the second recessed part and the first recessed part are separated by a part of the upper cover.

5. The microfluidic sensor chip according to claim 1, wherein each resonance pattern is a periodic pattern.

6. The microfluidic sensor chip according to claim 1, further comprising a microwave patch attached to an upper surface of the upper cover, wherein a resonance frequency of the microwave patch is lower than a range of resonance frequency of the metamaterial layer.

7. The microfluidic sensor chip according to claim 1, wherein the resonance patterns are formed on the metamaterial layer through at least one of a cathodic etching technique, a metal evaporation technique and an ion-beam etching technique.

8. A measuring system for microfluidic sensor chip, comprising:
   a carrying board;
   a plurality of microfluidic sensor chips disposed on the carrying board, wherein each microfluidic sensor chip comprises:
     a body comprising a substrate and an upper cover, and the upper cover having at least one opening for injecting a testing sample;
     at least one microfluidic channel formed on the substrate and has a supporting surface, wherein the at least one microfluidic channel communicates with the at least one opening to carry the testing sample; and
     a metamaterial layer coated on the supporting surface, wherein the metamaterial layer has a plurality of regions, each having a corresponding resonance pattern, wherein the upper cover has a first recessed part recessed towards the substrate, and a projection of the first recessed part on the substrate covers projections of the regions on the substrate;
   a transmitter configured to emit a terahertz wave corresponding to the resonance pattern of at least one of the microfluidic sensor chips;
   a receiver configured to receive a reflected wave corresponding to the terahertz wave from at least one of the microfluidic sensor chips; and
   a processor in signal-transmittable connection with the receiver, the processor receiving the reflected wave from the processor, and determining a testing sample characteristic according to the reflected wave.

9. The measuring system for microfluidic sensor chip according to claim 8, further comprising a flow controller configured to control a flow or a flow rate of the testing samples.

10. The measuring system for microfluidic sensor chip according to claim 8, wherein the processor is further in signal-transmittable connection with the transmitter, and the processor obtains the testing sample characteristics based on a physical property difference between each of the terahertz waves and each of the reflected waves.

11. The measuring system for microfluidic sensor chip according to claim 10, wherein each of the physical property differences comprises a frequency difference or an amplitude difference.

12. The measuring system for microfluidic sensor chip according to claim 8, further comprising an actuator in signal-transmittable connection with the processor, wherein the actuator actuates the carrying board to rotate, for each of the microfluidic sensor chips to receive the corresponding terahertz wave sequentially.

13. The measuring system for microfluidic sensor chip according to claim 8, further comprising a first actuator and a second actuator, wherein the transmitter is disposed on a first turntable, the receiver is disposed on a second turntable, the first actuator is connected to the first turntable, the second actuator is connected to the second turntable, and the first actuator and the second actuator are in signal-transmittable connection with the processor.

* * * * *